United States Patent
Cheng et al.

(10) Patent No.: US 9,025,119 B2
(45) Date of Patent: May 5, 2015

(54) LCD MODULE AND LIQUID CRYSTAL PANEL

(71) Applicant: Shenzhen China Star Optoelectronics Technology Co., Ltd., Shenzhen, Guangdong (CN)

(72) Inventors: Jiahe Cheng, Shenzhen (CN); Dehua Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/980,049

(22) PCT Filed: Jun. 24, 2013

(86) PCT No.: PCT/CN2013/077759
§ 371 (c)(1),
(2) Date: Jul. 16, 2013

(87) PCT Pub. No.: WO2014/183318
PCT Pub. Date: Nov. 20, 2014

(65) Prior Publication Data
US 2014/0340601 A1    Nov. 20, 2014

(30) Foreign Application Priority Data
May 14, 2013 (CN) .......................... 2013 1 0177211

(51) Int. Cl.
*G02F 1/133* (2006.01)
*G02F 1/1333* (2006.01)
*G02F 1/1345* (2006.01)
*G02F 1/1362* (2006.01)
*G02F 1/1337* (2006.01)

(52) U.S. Cl.
CPC .................... *G02F 1/133308* (2013.01); *G02F 2001/133314* (2013.01); *G02F 2001/133317* (2013.01); *G02F 1/1345* (2013.01); *G02F 1/13452* (2013.01); *G02F 1/136286* (2013.01); *G02F 1/133707* (2013.01)

(58) Field of Classification Search
CPC .................... G02F 1/136286; G02F 1/133707; G02F 1/13452; G02F 1/13454
See application file for complete search history.

(56) References Cited

U.S. PATENT DOCUMENTS

2010/0157165 A1 *  6/2010  Hiroki et al. ................... 348/730

\* cited by examiner

*Primary Examiner* — Phu Vu
(74) *Attorney, Agent, or Firm* — Andrew C. Cheng

(57) ABSTRACT

A liquid crystal panel includes a first glass substrate, a second glass substrate, a TFT formed on an internal surface of the first glass substrate, an electromagnetic induction module disposed on one side of the internal surface of the first glass substrate for receiving electromagnetic waves to generate current to provide driving current to the TFT, and wireless data receiving modules respectively set up on at least two adjacent sides of the internal surface of the first glass substrate for receiving wireless data signals to provide data to the TFT. Therefore, the present invention wirelessly transmits data and driving current to the liquid crystal panel. In hence, it does not arrange FPC on four sides of the liquid crystal panel for connecting with a PCB circuit so that a frame for protecting FPC is no need. Therefore, it achieves the LCD module with non-frame on four sides.

16 Claims, 2 Drawing Sheets

LCD MODULE AND LIQUID CRYSTAL PANEL

BACKGROUND OF THE INVENTION

1. Field of the Invention

The present invention relates to a liquid crystal display (LCD) field, more particularly, to an LCD module and a liquid crystal panel thereof.

2. Description of the Prior Art

An LCD module has been broadly applied on account of advantages like lightness, slimness and low power consumption. With continuous producing development of an LCD module, there has been a trend toward an LCD module with non-frame because of its simple fashion appearance. The LCD module with non-frame means that there is none of frame over a liquid crystal glass substrate.

An LCD module with non-frame in the prior art, however, usually means three sides, not four, of the LCD module with non-frame based on the Gate On Array (GOA) technique that gate drivers directly are mounted on the glass substrate in array to get rid of traditional external gate driver IC so that it does not need an additional flexible circuit board (FPC) to guide lines, i.e. without using chip-on-film (COF). Therefore, it is unnecessary to arrange the FPC on the three sides of non-frame. Despite all that, it is still incapable of accomplishing an LCD with non-frame on four sides because it is necessary that the FPC set up on one side of the liquid crystal glass substrate connects with a printed circuit board (PCB) to input data source and driving current. As a result, it must have a frame over one side of the liquid crystal substrate to prevent the FPC on the side from damage so that it is incapable of achieving non-frame on four sides.

SUMMARY OF THE INVENTION

In order to solve the above technical problem, the object of the present invention is to provide an LCD module with non-frame on four sides and a liquid crystal panel thereof.

In one aspect of the present invention, a liquid crystal panel comprises a first glass substrate, a second glass substrate, a thin film transistor, an electromagnetic induction module, and a plurality of wireless data receiving modules. The first glass substrate and the second glass substrate are disposed in opposite arrangement. The TFT is formed on an internal surface of the first glass substrate. The electromagnetic induction module is disposed on at least one side of the internal surface of the first glass substrate and is used for receiving electromagnetic waves to generate current to provide driving current to the TFT. The plurality of wireless data receiving modules are respectively set up on at least two adjacent sides of the internal surface of the first glass substrate, for receiving wireless data signals to provide data sources to the TFT.

Furthermore, the electromagnetic induction module is a wired coupling circuit or a capacitance coupling circuit.

Furthermore, an electromagnetic wave transmitter transmits electromagnetic waves to the electromagnetic induction module, and a data transmitter wirelessly transmits data signals to the wireless data receiving module.

Furthermore, the wireless data signal is Wi-Fi signal, Bluetooth signal, or 3G signal.

In another aspect of the present invention, an LCD module comprising a back plate, a middle housing on the back plate and a liquid crystal panel on the middle housing is proposed. The liquid crystal panel comprises a first glass substrate, a second glass substrate, a thin film transistor, an electromagnetic induction module, and a plurality of wireless data receiving modules. The first glass substrate and the second glass substrate are disposed in opposite arrangement. The TFT is formed on an internal surface of the first glass substrate. The electromagnetic induction module is disposed on at least one side of the internal surface of the first glass substrate and is used for receiving electromagnetic waves to generate current to provide driving current to the TFT. The plurality of wireless data receiving modules are respectively set up on at least two adjacent sides of the internal surface of the first glass substrate, for receiving wireless data signals to provide data sources to the TFT.

Furthermore, the LCD module further comprises an electromagnetic wave transmitter and a data transmitter. The electromagnetic wave transmitter is correspondently located under the electromagnetic induction module and between the first glass substrate and an edge of the middle housing to transmit electromagnetic waves to the electromagnetic induction module. The data transmitter is correspondently located under the wireless electromagnetic induction module and between the middle housing and the back plate for transmitting wireless data signals to the wireless data receiving module.

Furthermore, a first hole is defined on an edge of the middle housing. A second hole is defined on the back plate. The electromagnetic induction module is on the edge and covers the first hole. The position of the second hole is correspondent to that of the first hole. The LCD module further comprises a power module mounted onto the external surface of the back plate. Lines from the power module are through the second hole and the first hole to the electromagnetic transmitter in order to supply power to the electromagnetic induction module.

Furthermore, the middle housing is made of plastic.

Furthermore, the electromagnetic induction module is a wired coupling circuit or a capacitance coupling circuit.

Furthermore, the wireless data signal is Wi-Fi signal, Bluetooth signal, or 3G signal.

In contrast to prior art, the LCD module and the liquid crystal panel in the present invention wirelessly transmits data and driving current to the liquid crystal panel. In hence, it does not arrange FPC on four sides of the liquid crystal panel for connecting with a PCB circuit so that a frame for protecting FPC is no need. Therefore, it achieves the LCD module with non-frame on four sides.

DESCRIPTION OF THE EMBODIMENTS

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
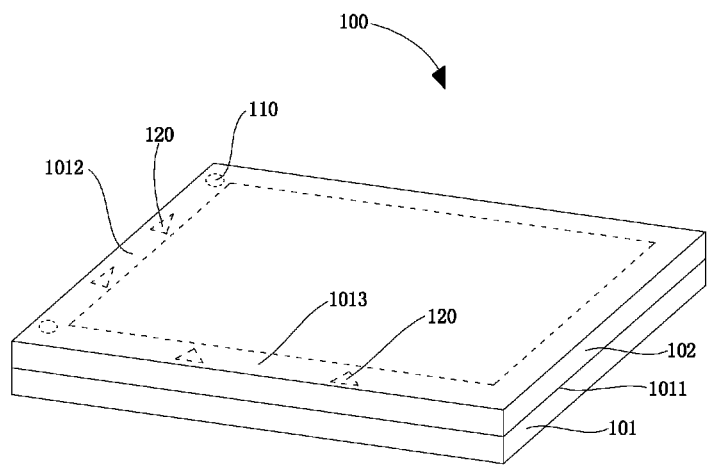
FIG. 1 illustrates a diagram of a liquid crystal panel according to a preferred embodiment of the present invention.

FIG. 1 illustrates a diagram of a liquid crystal panel according to a preferred embodiment of the present invention.

Referring to FIG. 1, a shape of a liquid crystal panel 100 according to the embodiment in the present invention is but not limited to a neat rectangle. The liquid crystal panel 100 comprises a first glass substrate 101 and a second glass substrate 102 in opposite arrangement, and thin film transistors (TFTs) (not shown) is formed on an internal surface 1011 of the first glass substrate 101 as a display zone (a dotted frame in FIG. 1).

According to the embodiment, two electromagnetic induction modules 110 (a dotted circle in FIG. 1) for receiving electromagnetic waves to induce current to provide driving current to the TFTs are set up on a first side 1012 (locating in non-displaying zone) of the internal surface 1011 of the first glass substrate. The electromagnetic induction module 110 is a wired coupling circuit (inductive coupling circuit) or capacitance coupling circuit. It allows arranging at least one electromagnetic induction module 110 on one or more sides of the internal surface 1011 of the first glass substrate. Such arrangement is not limited in FIG. 1. In the meantime, the first side 1012 and the second side 1013 adjacent to the first side 1012, non-display zone, on the internal surface 1011 of the first glass substrate are respectively arranged two wireless data receiving modules 120 (the dotted triangle in FIG. 1) for accessing wireless data signals and then providing data sources to the TFT. The wireless data signal is able to be Wi-Fi, Bluetooth or 3G signal. Such arrangement is not limited in FIG. 1. Therefore, it is without doubt that any adjacent two, three sides or four sides on the internal surface 1011 of the first glass substrate respectively arrange at least one wireless data receiving module 120.

The electromagnetic induction module 110 and the wireless data receiving module 120 are formed on the internal surface 1011 of the first glass substrate 101 by etching. In addition, the only limit of position of the electromagnetic induction module 110 on the first side 1012 and that of the wireless data receiving module 120 on the first side 1012 is not overlapping.

Figure 2:
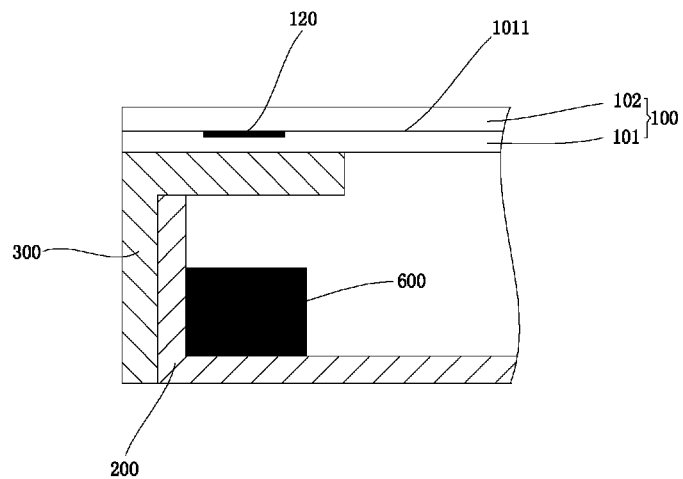
FIG. 2 shows a partial diagram of an LCD module according to the embodiment in the present invention.
Figure 3:
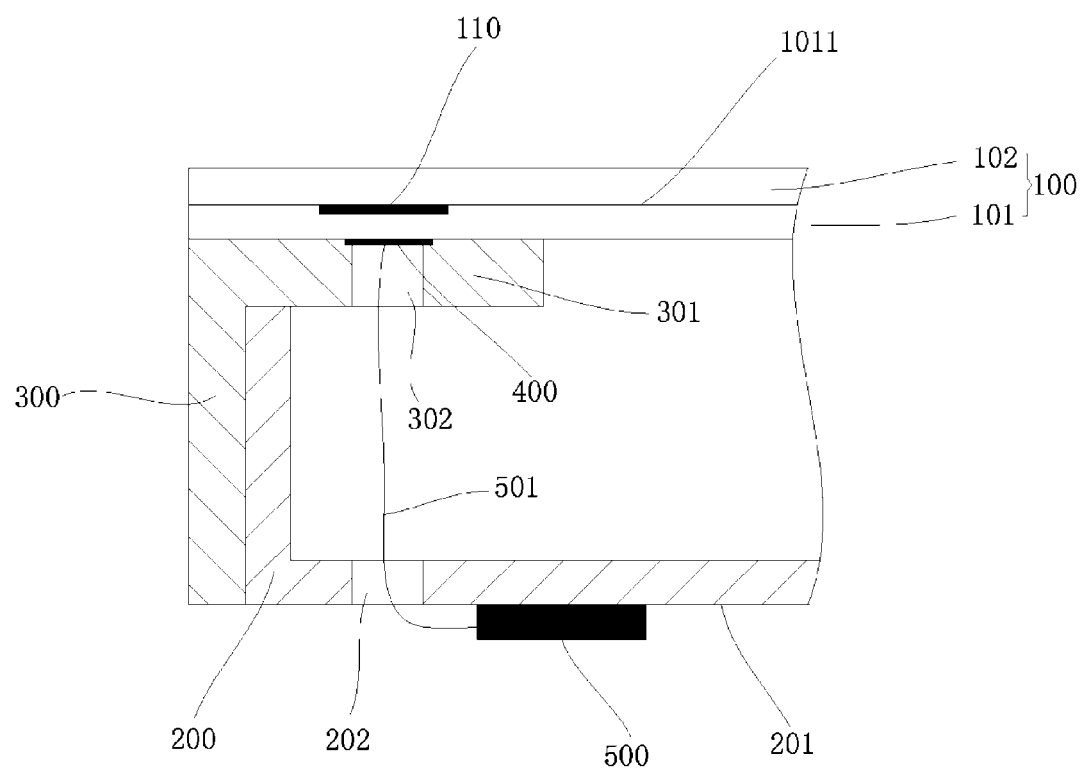
FIG. 3 shows another partial diagram of an LCD module according to the embodiment in the present invention.

FIG. 2 shows a partial diagram of an LCD module according to the embodiment in the present invention. FIG. 3 shows another partial diagram of an LCD module according to the embodiment in the present invention. FIG. 2 shows the wireless data receiving module and a data transmitter, while FIG. 3 shows the electromagnetic induction module and an electromagnetic wave transmitter Referring to FIG. 2 in conjunction with FIG. 3, the LCD module comprises a back plate 200, a middle housing 300 on the back plate 200 and a liquid crystal panel 100 on the middle housing 300. The present invention not only proposes the liquid crystal panel 100 fixed to the middle housing 300 in a traditional technology but also proposes to wirelessly transmit data and driving current to the liquid crystal panel 100. In hence, it does not arrange FPC on four sides of the liquid crystal panel for connecting with a PCB circuit so that a frame for protecting FPC is no need. Therefore, it achieves the LCD module with non-frame on four sides.

Moreover, it arranges an electromagnetic wave transmitter 400 corresponding to each electromagnetic induction module 110 and locating between the first glass substrate 101 and an edge 301 of the middle housing 300 to transmit electromagnetic waves to the electromagnetic induction module 110. Furthermore, it sets up a first hole 302 on the edge 301 where each electromagnetic transmitter 400 is for supplying power to the electromagnetic transmitter 400. In other words, each electromagnetic transmitter 400 is disposed on the edge 301 and covers the first hole 302. In addition, a second hole 202 correspondent to each first hole 302 is defined on the back plate 200. A power module 500 is mounted onto the external surface 201 of the back plate 200, i.e. the power module 500 is set up outside the whole LCD module. Lines 501 from the power module 500 is through the second hole 202 and the first hole 201 to the electromagnetic transmitter 400 in order to supply power to the electromagnetic induction module 110.

The present invention is able to arrange a backup battery to the electromagnetic transmitter 400 to power itself as well. If so, drilled holes in the edge 301 and the back plate 200 are no need. Therefore, the electromagnetic transmitter 400 correspondingly locates under the electromagnetic induction module 110 and between the first glass substrate 101 and the edge 301 of the middle housing 300.

It correspondingly arranges a data transmitter 600 under each wireless electromagnetic induction module 120 and between the middle housing 300 and the back plate 200 for transmitting wireless data signals to the wireless data receiving module 120.

Besides that, substance of the middle housing 300 is plastic, preferably thermoset plastic such as bakelite, epoxy plastic, etc.

In sum, the LCD module transmits data sources and driving current to the liquid crystal panel via radio transmission technology. In hence, it does not arrange FPC on four sides of the liquid crystal panel for connecting with a PCB circuit so that a frame for protecting FPC is no need. Therefore, it achieves the LCD module with non-frame on four sides.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal panel comprising:
    a first glass substrate and a second glass substrate in opposite arrangement;
    a TFT formed on an internal surface of the first glass substrate;
    an electromagnetic induction module, disposed on at least one side of the internal surface of the first glass substrate, for receiving electromagnetic waves to generate current to provide driving current to the TFT; and
    a plurality of wireless data receiving modules, respectively set up on at least two adjacent sides of the internal surface of the first glass substrate, for receiving wireless data signals to provide data sources to the TFT.

2. The liquid crystal panel of claim 1, wherein the electromagnetic induction module is a wired coupling circuit.

3. The liquid crystal panel of claim 1, wherein the electromagnetic induction module is a capacitance coupling circuit.

4. The liquid crystal panel of claim 1, wherein an electromagnetic wave transmitter transmits electromagnetic waves to the electromagnetic induction module, and a data transmitter wirelessly transmits data signals to the wireless data receiving module.

5. The liquid crystal panel of claim 1, wherein the wireless data signal is Wi-Fi signal.

6. The liquid crystal panel of claim 1, wherein the wireless data signal is bluetooth signal.

7. The liquid crystal panel of claim 1, wherein the wireless data signal is 3G signal.

8. An LCD module comprising a back plate, a middle housing on the back plate and a liquid crystal panel on the middle housing, the liquid crystal panel comprising:
    a first glass substrate and a second glass substrate in opposite arrangement;
    a TFT formed on an internal surface of the first glass substrate;
    an electromagnetic induction module, disposed on at least one side of the internal surface of the first glass substrate, for receiving electromagnetic waves to generate current to provide driving current to the TFT; and a plurality of wireless data receiving modules, respectively set up on at least two adjacent sides of the internal surface of the first glass substrate, for receiving wireless data signals to provide data sources to the TFT.

9. The LCD module of claim 8 further comprising:

an electromagnetic wave transmitter correspondently locating under the electromagnetic induction module and between the first glass substrate and a edge of the middle housing to transmit electromagnetic waves to the electromagnetic induction module; and a data transmitter, correspondently locating under the wireless electromagnetic induction module and between the middle housing and the back plate, for transmitting wireless data signals to the wireless data receiving module.

10. The LCD module of claim 8, wherein a first hole is defined on a edge of the middle housing, a second hole is defined on the back plate, the electromagnetic induction module is on the edge and covers the first hole, a position of the second hole is correspondent to that of the first hole, the LCD module further comprises:

a power module mounted onto the external surface of the back plate, lines from the power module being through the second hole and the first hole to the electromagnetic transmitter in order to supply power to the electromagnetic induction module.

11. The LCD module of claim 8, wherein the middle housing is made of plastic.

12. The LCD module of claim 8, wherein the electromagnetic induction module is a wired coupling circuit.

13. The LCD module of claim 8, wherein the electromagnetic induction module is a capacitance coupling circuit.

14. The LCD module of claim 8, wherein the wireless data signal is Wi-Fi signal.

15. The LCD module of claim 8, wherein the wireless data signal is bluetooth signal.

16. The LCD module of claim 8, wherein the wireless data signal is 3G signal.

* * * * *